May 26, 1970  R. L. BATES ET AL  3,513,710
FLUIDIC DIGITAL LINEAR AND ANGULAR MOTION SENSOR
Filed Dec. 21, 1966  2 Sheets-Sheet 1
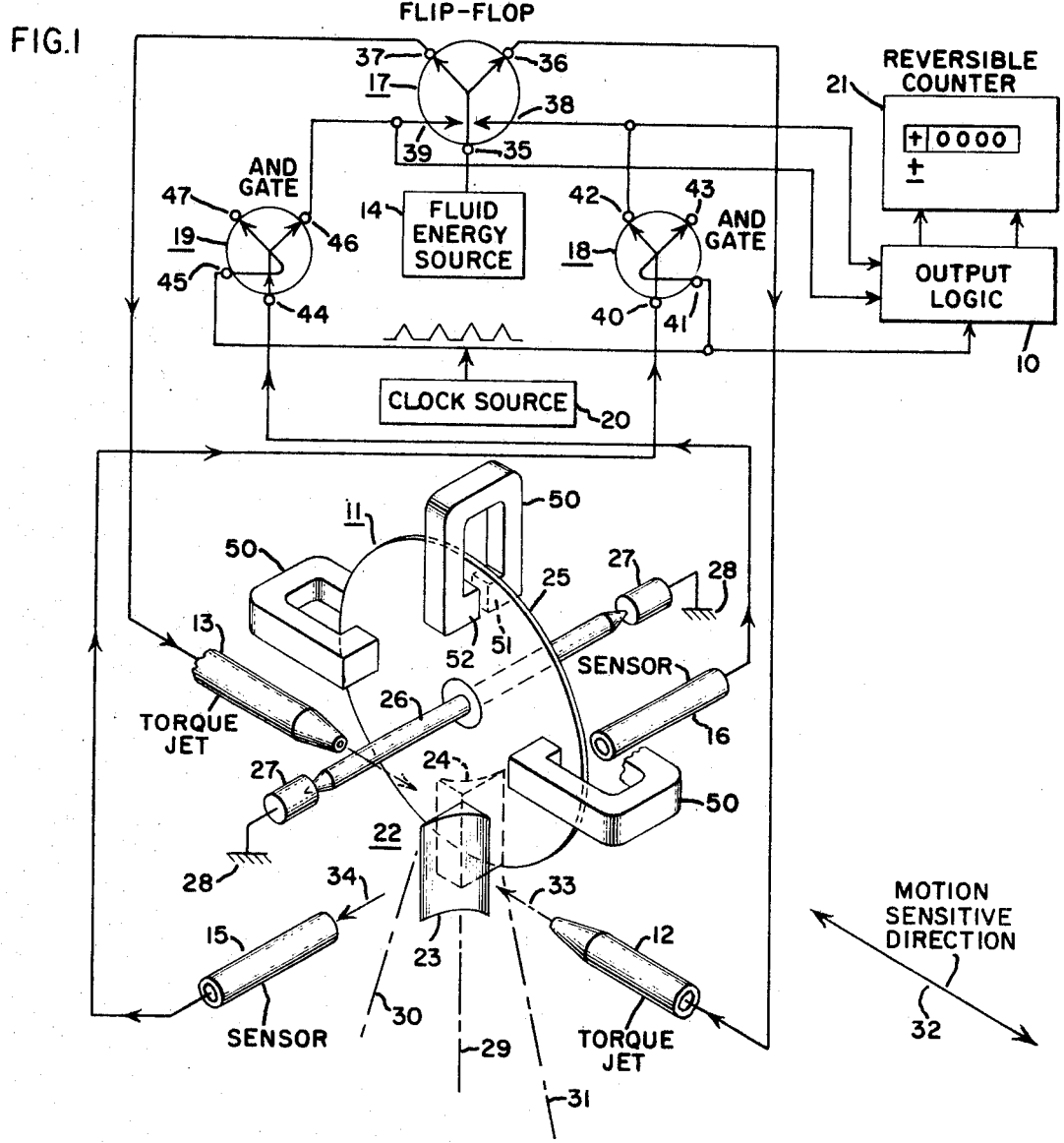
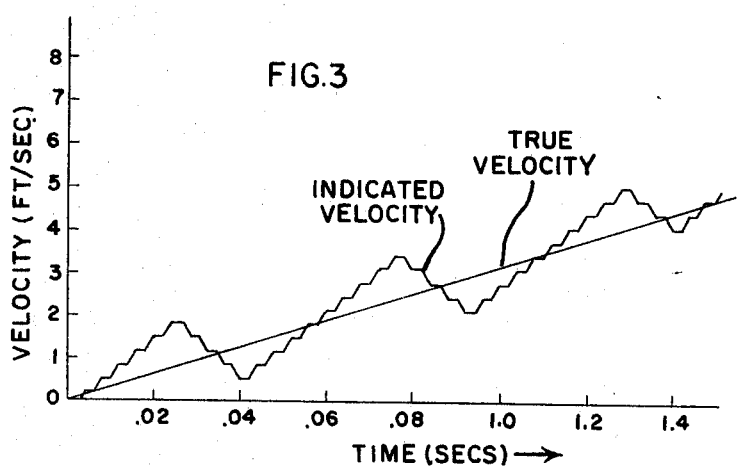
INVENTORS:
RICHARD L. BATES,
PHILIP E. TALLEY.
BY *Richard Lang*
THEIR ATTORNEY.

May 26, 1970  R. L. BATES ET AL  3,513,710
FLUIDIC DIGITAL LINEAR AND ANGULAR MOTION SENSOR
Filed Dec. 21, 1966  2 Sheets-Sheet 2
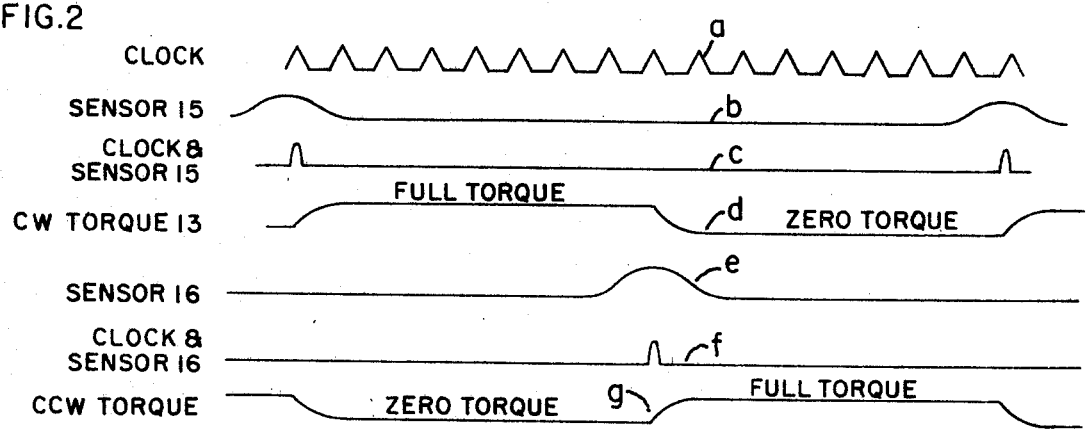
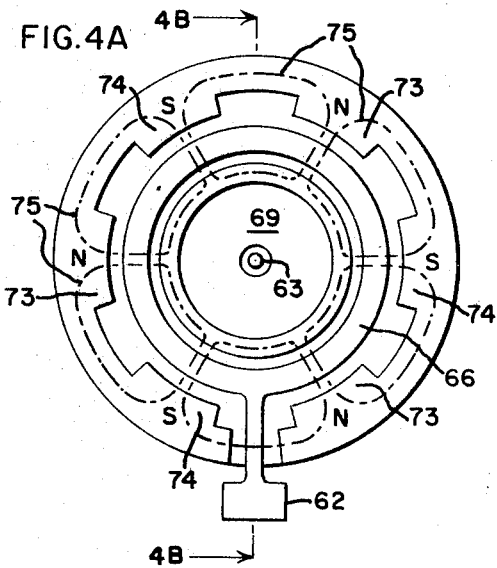
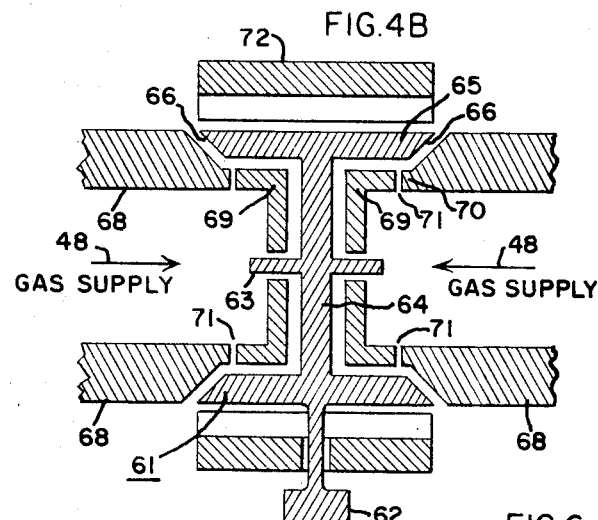
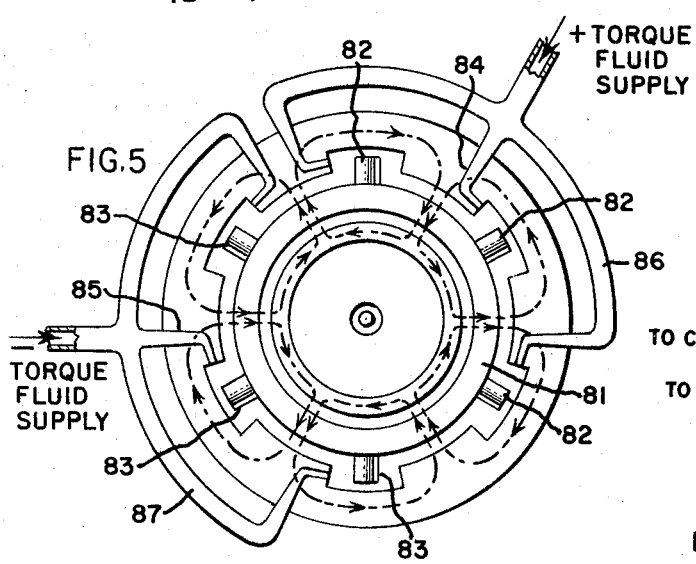
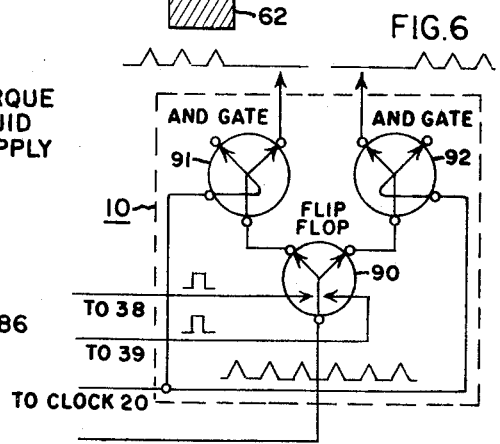
INVENTORS:
RICHARD L. BATES,
PHILIP E. TALLEY,
BY Richard Lang
THEIR ATTORNEY.

United States Patent Office 3,513,710
Patented May 26, 1970

3,513,710
FLUIDIC DIGITAL LINEAR AND ANGULAR
MOTION SENSOR
Richard L. Bates, Camillus, N.Y., and Philip E. Talley,
Jr., Paoli, Pa., assignors to General Electric Company,
a corporation of New York
Filed Dec. 21, 1966, Ser. No. 603,676
Int. Cl. G01p 15/00
U.S. Cl. 73—503                                    12 Claims

ABSTRACT OF THE DISCLOSURE

A fluidic digital accelerometer is disclosed for linear or angular motion. An acceleration sensing mass is provided which is caused to reciprocate continuously about a null position by a pair of opposed fluid torque jets. Any acceleration will cause a displacement in the average position of the mass and a time difference between the amounts of time required for the respective torque jets to establish a dynamic balance. Each jet is operated in evenly spaced timing intervals while the mass is on the same side of null position as the jet, and separate counts are made of the intervals that each jet is in operation. The total count obtained by subtracting one count from the other gives the accumulated velocity. The counting rate gives the acceleration.

The present invention relates to linear or angular accelerometers for sensing linear or angular accelerations, and indicating the accelerations and/or the accumulated velocities. More particularly, the invention relates to sensors providing a digital output and having both fluidic controls and utilizing a fluidic power source.

The invention has application to both guidance and navigation systems in which the output is applied to other mechanisms for further computational or control functions as well as to instrumentation where the measured acceleration or velocity (linear or angular) is to be provided directly to an observer. Typical applications of the invention are in high performance aircraft or missiles.

In such applications it is desirable that both the output be in a suitable format for processing and the apparatus take a form compatible with the severe environmental conditions that such applications impose. Prior art devices having an analog output as a measurement of acceleration introduce additional complexity when it is desired to integrate the measured accelerations to provide velocity or positional information. When integration is desired, it is preferable that the accelerometer output be in a digital form. The severe environmental conditions in many missile and air-borne applications tend to hamper the functioning of electronic circuitry.

Many of these latter problems may be bypassed by resort to fluidic power and control. Fluidic circuitry is characterized by a high degree of general reliability due to the general absence of moving parts, a property that it shares with electronic circuitry. While in comparison to electronic circuitry, fluidic circuitry is slow, there are many applications where its speed is quite adequate. It is in respect to environmental conditions, however, that fluidic circuitry has marked advantages over electronic circuitry. Fluidic devices are operable over much greater temperature ranges than electronic devices and in principle are restricted only by changes of state of the fluidic medium and the confining solid members. If a gas such as hydrogen is the fluidic medium, the lower temperature limit may approach absolute zero, and the upper limit may be set by the softening point of the solids which confine it. If these latter are made of refractory materials upper temperature limits are extremely high. Fluidic devices are inherently highly immune to shock and vibration, a quality which can be further improved by design to fit many highly demanding practical applications. Finally, fluidic circuits have a greater general immunity to high energy particle fluxes, radiation, and high intensity electro-magnetic fields than corresponding electronic circuits.

Accordingly, it is an object of the present invention to provide a fluidic accelerometer wherein all power and control functions are fluidic.

It is a further object of the invention to provide a fluidic accelerometer wherein the output indication is in digital form for convenient real time integration.

It is still another object of the present invention to provide an improved linear accelerometer having an output in digital form and subject to fluidic power and control.

It is an additional object of the present invention to provide an improved angular accelerometer having an output in digital form and subject to fluidic power and control.

Briefly stated, these and other objects of the invention are achieved in one practical form in a linear accelerometer which comprises a rotationally supported member, reciprocating under the influence of opposed fluidic torquing means, and having an unbalanced or pendulous mass supported thereon, and displaced from the center of rotation. When the accelerometer is subjected to a linear acceleration having a component along a direction in which the pendulous mass is free to be displaced, the center of reciprocation is displaced from a null position. Thereupon, the torquing means, under the joint control of a null sensor and an incremental timing control, applies a restoring torque in the form of a longer energization of one torquing means than of the other to achieve balance. Because of the incremental nature of the control of the torquing means, the intervals of operation of the respective torquing means are continuously counted; counting the intervals of one in a forward direction and of the other in a reverse direction to obtain a count which yields both the magnitude of the velocity and its polarity. Inherently, the count is a real time integration of the torque impulses required to balance each incremental acceleration, and gives the accumulated velocity. The counting rate gives the acceleration.

In achieving control and powering the movable mass conventional fluidic components are used throughout, including a fluidic power source, a fluidic clock source, fluidic AND gates for simultaneously sensing null and clock pulses to control torquing polarity; fluidic flip-flops for switching and for powering the movable mass. The output is counted by fluidic counters.

In an embodiment in which angular acceleration is being measured, a rotationally supported member is also employed. The rotational member, in this case, is balanced to remove sensitivity to linear accelerations and to make the accelerometer responsive to angular acceleration only. It responds to angular accelerations about its axis of rotation.

In each embodiment, control of the oscillations which are produced by fluidic torquing means may be achieved by eddy current damping. In certain embodiments, gas bearings are provided for support of the movable member.

The novel and distinctive features of this invention are set forth in the claims appended to the specification. The invention itself, however, together with the further objects and advantages thereof may best be understood by reference to the following description and accompanying drawings, in which:

FIG. 1 is a view of a first embodiment of the invention for linear motion measurement illustrating both the significant mechanical features and a schematic representation of the associated fluidic circuitry;

FIG. 2 is a collection of fluidic waveforms plotted against a common time axis to illustrate the functioning of the fluidic circuitry;

FIG. 3 is a plot of the indicated velocity of the accelerometer over a period of time under the condition that the accelerometer is subject to a predetermined acceleration;

FIGS. 4A and 4B are sectional views of a second embodiment of the invention in which certain mechanical refinements have been made in respect to bearings and damping;

FIG. 5 is a sectional view of a third embodiment of the invention for angular motion measurement; and FIG. 6 is a schematic diagram of a fluidic arrangement for performing the output logic function in obtaining a velocity indication.

Referring now to FIG. 1, an embodiment of the invention for linear motion measurement is illustrated in simplified schematic form. The waveforms applicable to FIG. 1 are shown in FIG. 2. It comprises an inertial motion sensing member 11, and a pair of pneumatic torque jets or thrust jets 12 and 13, powered by fluidic energy source 14, which is typically a container of compressed gas, with suitable pressure regulators. The torque jets are arranged to cause reciprocating motion of the sensing member 11 under the partial control of position sensors 15 and 16, and a fluidic flip-flop 17. The embodiment comprises additional means for controlling each jet, including a pair of AND gates 18 and 19 which subject the flip-flop 17 to the accurate timing control of a fluidic clock source 20 in order to meter out the torque impulse applied by each jet in discrete increments. The output of clock source 20 is shown at a in FIG. 2.

The acceleration sensing member 11 comprises a pendulous mass 22 in the form of a pair of jet deflectors or buckets 23 and 24 supported on the margin of thin conductive disc or flange 25. The disc 25 is supported upon a central shaft 26 arranged to rotate in a pair of bearings, schematically represented at 27, fixed to the accelerometer case 28, also schematically represented. Preferably the bearings should be of a type which minimize friction and may be jeweled or air supported, the latter being preferable. The non-centrally supported or pendulous mass 22 is illustrated in FIG. 1 in a position directly under the shaft 26. This position is the null position and is indicated by the vertical dashed line 29. When the mass 22 is caused to reciprocate, as will subsequently be explained, reciprocation is about null position 29. Typically the amplitude of the swings are short segments of arc from 3 to 6 degrees to either side of the null as indicated in exaggerated fashion by the limits shown at 30 and 31 respectively. In critical applications the swings may be reduced to a few minutes of arc. The maximum permissible amplitudes in pivoted arrangements is dependent upon the tolerable degree of sensitivity to motion orthogonal to the sensitive direction and in the plane of motion. The sensitive direction indicated at 32 is parallel to the tangent to the null point 29 of said arc.

The foregoing mechanical features provide means to inertially sense motion. When the total assembly, i.e., the accelerometer case, is accelerated to the right (assuming the orientations in FIG. 1), the effect of the inertia of the pendulous mass 22 in consequence of its non-central position and pivotal support, is to cause it to lag behind the accelerometer frame and to induce clockwise rotation of the member 11 relative to the frame. This property is often referred to as pendulosity and is measured in slug-feet. Similarly acceleration to the left brings about counterclockwise rotation of the member 11. Thus the natural motion sensitive direction 32 of the accelerometer is a plane orthogonal to the rotational axis of the shaft 26 and perpendicular to the null line 29 of the accelerometer.

Reciprocating motion of the motion sensing member 11 is provided in the following manner. The torque jet 12 is oriented parallel to the sensitive direction 32 and directs a focused stream of air or other fluid 33 to the left (assuming the orientations in FIG. 1), which strikes the jet deflection surface 23 which is curved and obliquely oriented to the jet stream to cause an orthogonal deflection. In reaction, the motion sensing member 11 rotates in a clockwise direction. Upon impact of the jet stream 33 upon the deflection surface 23, it is deflected toward the viewer and perpendicular to the disc plane of the member 11 as shown by the arrow 34. A first jet sensor 15 is disposed on the side of the member 11 toward the viewer and is placed orthogonal to the disc plane at the null position. This is to provide detection of the deflected stream from the jet 12, at the moment when the pendulous mass 22 reaches null position 29 from a right hand deflection. Similarly the second torque jet 13 is oriented parallel to the sensitive direction 32 and directs a focused stream of air to the right (assuming the orientations in FIG. 1), which strikes the hidden jet deflection surface 24. This surface deflects the stream away from the viewer and also perpendicular to the disc plane of the member 11. The jet 13 applies a counterclockwise torque to the member 22, and the second sensor 16 is arranged to detect the deflected jet stream as the member 11 crosses null position 29 from a left hand deflection. Preferably both power jets 12 and 13 have focusing nozzles which direct the fluid flow to exert a torque upon the buckets which is substantially independent of the position of the deflection surfaces 23 and 24 in the path of motion.

Power from the fluidic energy source 14 is supplied to the jets 12 and 13 through the pneumatic flip-flop 17. The pneumatic flip-flop 17 is of conventional design, having a pneumatic source connection 35, power output connections 36 and 37, and control input connections 38 and 39. When suitably energized at the source connections 35, the flip-flop is designed so that a momentary application of a control signal to input connection 38 will switch power supplied to the source connection 35 to output connection 37. Similarly a momentary control signal applied to input connection 39 will divert the power to output connection 36. The fluidic flip-flop thus switches the power to one or the other of the output connections in a conventional manner and holds it in the latest condition until a changing control signal is applied. The power connection 35 of the flip-flop is connected to the pneumatic energy source 14. One output connection 36 of the flip-flop is pneumatically coupled to the torque jet 12 and the other output connection 37 is coupled to the torque jet 13. The connection of the jets 12 and 13 to the separate output terminals 36 and 37 of the flip-flop causes them to operate in alternation, as illustrated in FIG. 2 at d and g respectively, dependent upon the successive states of the flip-flop.

In certain practical applications it may be preferable to control a high pressure flip-flop which supplies operating power to the jets 12 and 13 from a low pressure flip-flop itself directly coupled to the AND gates 18 and 19. In such a configuration, the output of the first flip-flop may be amplified by a succession of fluidic amplifiers of successively increasing power. These amplifiers raise the level of control energy to the level required for operating a high pressure flip-flop suitable for powering the reciprocating element.

A necessary condition for supporting continuous reciprocation of the mass 11 is that the state of the flip-flop 17 be responsive to the position of the motion sensing mass 11. This is achieved by coupling the input control connections 38 and 39 of the flip-flop to the position sensors 15 and 16. The control paths, for reasons which will be elaborated below, include the AND gates 18 and 19.

The control components and their connections are as follows: The AND gate 18 is a fluidic device having a pair of input connections 40 and 41 and a pair of output connections 42 and 43. When fluidic signals are applied to both input connections 40 and 41, the AND gate 18 provides an output at AND terminal 42. In the event that a signal is applied to only one input terminal, and output appears at terminal 43. The AND gate 19 is a similar device having corresponding input terminals 44 and 45 and an AND output terminal 46 (corresponding to output terminal 42) and a further output terminal 47 (corresponding to output terminal 43). The sensor 15 is fluidically coupled to input terminal 40 of AND gate 18, and the output terminal 42 of the AND gate is in turn coupled to the input connection 38 of the flip-flop 17. Similarly, the sensor 16 is coupled to the input terminal 44 of the AND gate 19, and the output terminal 46 of the AND gate 19 is in turn coupled to the input connection 39 of the flip-flop 17.

The coupling action may be explained by assuming a hypothetical signal continuously applied to AND gate terminals 41 and 45 so as to complete the path between terminals 40 and 42 in AND gate 18 or between connections 44 and 46 in AND gate 19. Futher assuming that the pendulous mass 22 is being driven clockwise toward null position 29 under the influence of torque jet 12, the deflected stream 34 is also progessively moving in a clockwise direction toward the null. When it approaches the null, the sensor 15 picks up the deflection stream 34 as shown at *b* in FIG. 2 and couples it through the AND gate to the input connection 38 of the flip-flop. Energizing this input connection switches the output of the flip-flop from the output terminal 36, which until this moment has been energizing the torque jet 12, to the output terminal 37 which thereupon energizes torque jet 13. The torque jet 13 thereupon proceeds to exert a torque upon the pendulous mass 22 tending to halt its clockwise rotation and to produce counterclockwise rotation back toward null. As the pendulous mass 22 crosses the null in a counterclockwise direction, the torque jet 13 is similarly turned off as the sensor 16 senses the deflected stream as shown at *e* in FIG. 2 and signals the flip-flop input terminal 39 to turn off output terminal 37 and re-energize output terminal 36 and jet 12. In this manner it may be seen that the pendulous mass is successively driven back and forth through null position 29. (In practice, as will be explained below, the hypothetical signal is the clocking signal, and is passed through the gates 18 and 19 together with the sensing signal as shown at *c* and *f* in FIG. 2.)

In order to provide a measure of control to the amplitude of swings of the pendulous mass 22, eddy current damping means 50 are provided. As illustrated, they comprise three permanent magnets of horseshoe configuration. The horseshoe configuration is modified so as to optimize the flux concentration in the region between the pole pieces illustrated at 51 and 52. Each of the permanent magnets is supported in sectors spaced around the surface of the disc 25 with substantially their total interpolar flux region acting upon the disc, with the flux substantially orthogonal to the plane of the disc. The effect of this juxtaposition of the magnetic field producing members and the conductive disc 25 is to induce eddy currents in the disc when it is rotated. In the well known manner, these eddy currents in turn produce fields proportional to the rate of rotation of the disc which tend to resist such rotation. The net effect of the eddy current damping is to reduce the rotational velocity of the member 11.

The accelerometer depends upon a dynamic balance between the displacement of the motion sensing member 11 and the restoring effect of the opposed jets 12 and 13. A precise measurement of the restoring effect of the opposed jets 12 and 13 and thereby the case motion (velocity) is provided by maintaining the torque of the jets substantially constant and controlling their time of application by a clock. This permits changes in fixed increments.

Measured incremental torque impulse control is brought about by clock source 20, gates 18 and 19. Ultimately the reversible counter 21 indicates the accumulated effect of the jets (and thereby the velocity) obtaining counts of the intervals of each jet's operation through output logic 10. The clock source 20 may take the form of an acoustic resonator which provides a series of spaced pulses, typically from 250–1000 pulses per second, although both lower and higher frequencies may be used. It is ordinarily preferable for the clock interval to be some small fraction, typically from one-fifth to one-fiftieth of the period required for reciprocation of the sensing member 11. This relation must be consistent with obtaining a clock pulse during the sensing pulse duration. Clock source 20 is coupled to one input 41 of the AND gate 18 and to one input 45 of the AND gate 19. The AND gates which are introduced between the sensors 15, 16 and the control inputs of the flip-flop 17, thus prevent the flip-flop 17 from switching and thereupon reversing the energization of the torque jets 12 and 13 until both the sensor and the clock source provide inputs to the AND gates. In this manner each torque jet is always turned off at the moment that a clock pulse occurs. By virtue of the substantially instantaneous de-energization of one torque jet upon the energization of the other, both jets are operated for essentially integral clocking intervals.

The output indication, as indicated above is provided by the output logic 10 and reversible counter 21. The output logic 10 is a fluidic component and has an input connection to clock source 20, and a pair of input connections to the control connections 38 and 39 of the flip-flop 17. The output logic 10 has two output connections; one designed to carry a train of clocking pulses while flip-flop 17 is in one condition (SET); the other designed to carry a train of clocking pulses while flip-flop 17 is in the other condition (UNSET).

Output logic 10 may take the form illustrated in FIG. 6. There it is seen to consist of a flip-flop 90, powered by source 14, and controlled by the same pulses used to control flip-flop 17 (*c* and *f* in FIG. 2), applied respectively to the two input connections of the flip-flop. The flip-flop 90 has its outputs separately fed to an input terminal of each of two AND gates 91 and 92, whose other input terminals are coupled to the clock source 20. The AND output terminal of each AND gate 91 and 92 is then separately coupled to the forward and reverse counting inputs of the reversible counter 21.

The circuit of 10 may be seen to provide a series of clock pulses to the reversible counter 21, first on one output connection and then on the other. The output connection is selected in accordance with the state of the flip-flop 90, which is controlled by the same pulses as control the flip-flop 17 powering the jets 12 and 13. Thus the flip-flop 90 operates in synchronism with the flip-flop 17 and produces long output pulses like those illustrated at *d* and *g* in FIG. 2. The AND gates 91 and 92, to which the clock source 20 is continuously connected, thus produce outputs in the form of a series of clock pulses, each series lasting for the duration of the corresponding output pulse of flip-flop 90 which turns that particular AND gate on. The reversible counter is coupled to the output connections of the output logic 10, one output connection being made to a forward counting input of the reversible counter and the other to a reverse counting input. Thus one series of clock pulses is counted forwardly and the other reversely in the counter.

Preferably the counter is fluidic, as are the other components of the present system, and consists of a series of fluidic stages for counting the applied counts in binary fashion. If one wishes to read the numbers directly as illustrated in FIG. 1, conversion to a decimal system may be made. They may also be utilized without indication in automatic control functions.

The counter 21 indicates in precise fashion whether one torque jet is operating more than the other by obtaining the net number of impulses that one exceeds the other for balance. In normal operation, assuming rest condition, one may typically obtain six counts for one jet then six counts for the other. A balanced net count indicates a state of rest. As the accelerometer case is accelerated along the sensitive axis, for instance to the right in FIG. 1, the torque jet 13 will be required to operate for a somewhat longer period. A state of slowly accelerating motion may require the torque jet 13 to provide seven pulses while the torque jet 16 provides six for each oscillation period. As the acceleration increases, however, one may find that the disparity increases to the point where the torque jet 13 may provide 10 or 11 pulses while the torque jet 12 may provide only three or four. FIG. 3 graphically illustrates the manner in which the velocity may be determined from the instantaneous net counts. While one may interpolate between fluctuations, ordinarily they are selected to be below the desired error in reading.

A second embodiment of the invention is illustrated in FIGS. 4A and 4B. FIG. 4A is a sectional view taken in a plane perpendicular to the rotational axis of the sensor, while FIG. 4B is a section view with the plane of the section including the rotational axis and intersecting the pendulous mass. This embodiment represents a more sophisticated accelerometer than the initial embodiment, in that it has a gas bearing and improved eddy current damping. It requires the same type of power and control equipment as the first embodiment.

The accelerometer in FIGS. 4A and 4B consist of a cylindrical conductive rotary member 61 having a pendulous mass 62 attached to its outer perimeter. The mass 62 is bucket shaped (as the corresponding member 22 in FIG. 1) to co-act with opposed torque jets and sensors in the manner illustrated in FIG. 1. The rotary member 61 is in the form of a wheel having an axial shaft 63 which extends through the web 64. The web 64 in turn centrally supports a cylindrical flange 65. The inner edges of the flange 65 are bevelled, typically at 45 degrees as illustrated at 66. The stationary member or case of the rate sensor is formed of two similarly formed, capped cylindrical parts 68 each having a central chamber. As viewed in FIG. 4B they are disposed respectively to the left and to the right of and coaxial with the rotary member 61. Each part 68 has a central orifice in the cap 69, opening into its central chamber, for receiving an end of the shaft 63 of the rotary member 61. The cap portion 69 is of reduced diameter and is arranged to extend down to the web 64 of the rotary member 61 and generally to follow in a closely spaced relation both its web and inner flange surfaces. In this manner, a continuous passage is provided from the central chamber to the space surrounding the accelerometer. A source of gas, illustrated schematically at 48, is coupled to the inner chambers of each stationary member 68. It forces gases along these passages until it vents into the surrounding space and acts to center the rotary member 61 within the stationary housing members 68 in both radial and axial directions. Additional passages 71 are provided in the circumference of the reduced cap portion 69 of the member 68 for enhancing radial alignment.

In the cap region 69, the members 68 are of high permeability magnetic material for purposes of improving the eddy current damping efficiency. For the same reason also, the cap region is shaped to closely follow the mating surfaces of the rotary member 61.

Eddy current damping in this second embodiment is provided by a multi-poled external magnetic member 72. It is arranged outwardly of the flange portion 66 of the rotary member 61. It has alternately spaced inwardly directed N and S poles (73 and 74 respectively) arranged to direct their magnetic flux inwardly and orthogonally to the flange 66. The flux paths are illustrated by the magnetic loops 75. It may be seen that the high permeability inner cap portion 69 of the stationary members 68 provide an efficient flux return path for the pole pieces. The arrangement increases the flux passing through the flange plate, and with the increased area permissible from a flange construction permits an optimum amount of eddy current damping.

In a practical embodiment of the invention in which it is desired to measure from zero to 2.5 $g$'s acceleration, the following parameters are typical of values which one may employ:

Pendulosity—$7.75 \times 10^{-6}$ slug-ft.
Jet Torque—$0.623 \times 10^{-3}$ lb.-ft.
Inertia—$3.605 \times 10^{-7}$ slug-ft.$^2$
Clock Rate—250 c.p.s.
Damping—$6 \times 10^{-5}$ lb.-ft./rad/sec.
Periodicity of approximately 20 c.p.s.

The invention may also be applied to angular rate sensing as shown in FIG. 5. FIG. 5 is a view taken in a plane perpendicular to the sensitive axis of the rate sensor. The rate sensor consists of a generally cylindrical rotary member 81 having a plurality of buckets 82, 83 upon its outer surface. The rotary member 81 is balanced so as to render the sensor insensitive to linear accelerations. One-half of these buckets 82 are arranged to co-act with a corresponding number of jets 84 tending to produce clockwise rotation of the rotary member 81, and one-half of these buckets 83 are arranged to co-act with a corresponding number of jets 85 arranged to produce counterclockwise rotation of the member 81. The jets 84 are jointly connected to a common manifold 86 which is energized in the same manner as the torque jet 12 in FIG. 1. Similarly, the jets 85 are connected to a common manifold 87 which is energized in the same manner as the torque jet 13 in FIG. 1. Sensors, not specifically illustrated, are placed adjacent at least one of the buckets 82 and adjacent at least one of the buckets 83 in a manner illustrated in FIG. 1. The buckets 82 and 83 may take the form illustrated in FIG. 1 so as to deflect a portion of the jet stream toward the adjacent sensors. The null sensors are connected as illustrated in FIG. 1.

The accelerometers have been discussed as utilizing constant energy jet streams in which the duration of power application by each torque jet is made equal to a varying number (depending on acceleration) of clock pulses. One may also utilize a similarly selected number of uniform short duration pulses, spaced at intervals equal to the clock rate or at a convenient multiple. This procedure would be employed as an alternative to the use of a constant amplitude pulse. When a constant energy pulse of several clock intervals duration is employed, the first and last sections of the pulse are modified because of transient rise and fall times respectively, whereas the central portion of the pulse is not so modified. This situation produces a non-uniform pulse value in terms of clocking intervals and produces a small distortion in the output indication. One may alleviate the problem by providing power in pulses, in such a manner that each pulse is subject to the same starting and terminating transients, and thus equivalent to each other. A pulse power circuit may take the form illustrated in FIG. 6, with the outputs from 10 being separately amplified to a sufficient power level to power the accelerometer, and then connected to the torque jets 12 and 13.

Although the invention has been described with respect to certain specific embodiments, it will be appreciated that various modifications and changes may be made by those skilled in the art without departing from the spirit and scope of the invention.

What is claimed as new and desired to be secured by Letters Patent in the United States is:

1. A fluidic digital accelerometer comprising:
    an acceleration sensing movable mass displaceable from an intermediate predetermined null position under constraints permitting a desired motion in response to a selected acceleration;
    a pair of opposed fluid thrusting means, one applying a force to said movable mass to drive it in one sense and the other in an opposed sense toward said null position;

timing means for obtaining clocking information at instants occurring at evenly spaced timing intervals;

control means, coupled to said timing means, said control means comprising means responsive to passage and sense of passage of said mass through said null position; means connected to said timing means and null responsive means to actuate alternately one of said thrusting means at the simultaneous occurrence of a null position and timing signal to cause said mass to reciprocate; and means to count the clocking intervals of operation of each thrusting means separately and to compare said counts to obtain the polarity and magnitude of the average thrust impulse required to balance said movable mass against said selected acceleration.

2. A fluidic digital accelerometer as set forth in claim 1 adapted for measuring linear motion, wherein said movable mass is constrained to move in a path which is a segment of arc at whose null point the tangent to said path is in the direction in which acceleration is to be sensed, and wherein said movable mass is displaced from the center of said arc for sensitivity to said linear motion.

3. A fluidic digital accelerometer as set forth in claim 1 adapted for measuring angular motion, wherein said movable mass is constrained for angular motion about an axis with respect to which angular motion is to be sensed, and wherein said movable mass is balanced with respect to said axis so as to eliminate sensitivity to linear motion.

4. A fluidic digital accelerometer as set forth in claim 1 having in addition thereto, a velocity proportional damping means acting upon said movable mass to restrict the amplitude of displacement.

5. A digital accelerometer as set forth in claim 4 wherein said movable mass is supported upon a centrally pivoted circular, conductive disc; and wherein said damping means comprises a source of magnetic flux arranged adjacent said conductive disc to induce eddy currents therein and produce a rotation resisting torque.

6. A digital accelerometer as set forth in claim 4 wherein said movable mass is supported upon a centrally pivoted circular disc having a conductive flange, and wherein said damping means comprises a source of magnetic flux arranged adjacent said flange to induce eddy currents therein and produce a rotation resisting torque.

7. A digital accelerometer as set forth in claim 1 wherein said control means includes a fluidic bistable device having one output coupled to control one fluid thrusting means and the other output coupled to control the other fluid thrusting means for alternate actuation thereof.

8. A fluidic digital accelerometer as set forth in claim 7 wherein said movable mass has a pair of buckets obliquely oriented to said thrusting mass to deflect the stream of said thrusting means, wherein said control means is provided with a pair of null sensors, each respectively oriented to detect the fluid deflected by one of said buckets as the movable mass passes null position; and wherein said bistable device has one input coupled to respond to one null sensor and the other input coupled to respond to the other null sensor.

9. A fluidic digital accelerometer as set forth in claim 8 wherein said control means further includes a pair of fluidic AND gates, one being interposed between one of said null sensors and one input of said bistable device for gated control thereof, and the other being interposed between the other of said sensors and the other input of said bistable device for gated control thereof, said AND gates being only responsive to the simultaneous presence of a clocking signal coupled thereto and to an output from the null sensor coupled thereto.

10. A fluidic digital accelerometer as set forth in claim 1 wherein said movable mass is provided with a bucket arranged in the path of the stream of said fluid thrusting means and oblique thereto so as to impart a thrust upon said movable mass and to deflect the jet stream to one side, and said control means includes a fluidic position sensor adjacent the null position, adapted to sense said deflected jet stream as the movable mass passes said null position.

11. A digital accelerometer as set forth in claim 1 wherein said counting means is a reversible counter arranged to algebraically count the counts for one thrusting means in a positive sense and the counts for the other thrusting means in the negative sense.

12. A fluidic digital accelerometer as set forth in claim 1 wherein said fluid thrusting means is pulsed at the clocking rate of said timing means or a multiple thereof.

References Cited

UNITED STATES PATENTS

| | | | |
|---|---|---|---|
| 2,940,306 | 6/1960 | Lozier | 73—517 |
| 3,062,059 | 11/1962 | Singleton | 73—517 |
| 3,335,612 | 8/1967 | Stouffer | 73—516 |

JAMES J. GILL, Primary Examiner

H. GOLDSTEIN, Assistant Examiner

U.S. Cl. X.R.

73—515; 137—81.5